United States Patent
Humburg

Patent Number: 5,586,721
Date of Patent: Dec. 24, 1996

[54] DUAL-CIRCUIT VEHICLE HEATER

[75] Inventor: Michael Humburg, Göppingen, Germany

[73] Assignee: J. Eberspächer, Esslingen, Germany

[21] Appl. No.: 522,298

[22] PCT Filed: Jun. 23, 1994

[86] PCT No.: PCT/DE94/00735

§ 371 Date: Aug. 17, 1995

§ 102(e) Date: Aug. 17, 1995

[87] PCT Pub. No.: WO95/03187

PCT Pub. Date: Feb. 2, 1995

[30] Foreign Application Priority Data

Jul. 21, 1993 [DE] Germany .............. 43 24 371.1

[51] Int. Cl.$^6$ ........................................ B60H 1/02
[52] U.S. Cl. ........................... 237/12.3 B; 237/12.3 C
[58] Field of Search .................... 237/12.3 B, 12.3 C

[56] References Cited

U.S. PATENT DOCUMENTS

| 2,726,042 | 12/1955 | Baier et al. | 237/12.3 C |
| 4,018,380 | 4/1977 | Baier | 237/12.3 C |
| 4,195,777 | 4/1980 | Ikebukuro et al. | 237/12.3 B |
| 4,394,960 | 7/1983 | Nakazawa | 237/12.3 C |
| 4,705,214 | 11/1987 | Johnson | 237/12.3 C |
| 4,718,600 | 1/1988 | Adam | 237/12.3 C |
| 5,014,910 | 5/1991 | Koch et al. | 237/12.3 C |

FOREIGN PATENT DOCUMENTS

| 2412744 | 9/1975 | Germany . | |
| 3907222A1 | 3/1989 | Germany | B60H 1/06 |
| 3920505A1 | 6/1989 | Germany | B60H 1/03 |
| 4229608C1 | 9/1992 | Germany | B60H 1/03 |
| 4314089 | 3/1994 | Germany . | |

Primary Examiner—William E. Tapolcai
Attorney, Agent, or Firm—McGlew and Tuttle

[57] ABSTRACT

The invention relates to a vehicle heater with two circuits. One circuit leads from the vehicle's engine via a heating device and a heat exchanger back to the engine. The other circuit leads from the heating device via the heat exchanger back to the heating device. These two circuits may be automatically switched by a single valve, a two-way valve structurally combined with a check valve, so that no auxiliary power, e.g. current from the vehicle battery, is needed.

15 Claims, 2 Drawing Sheets

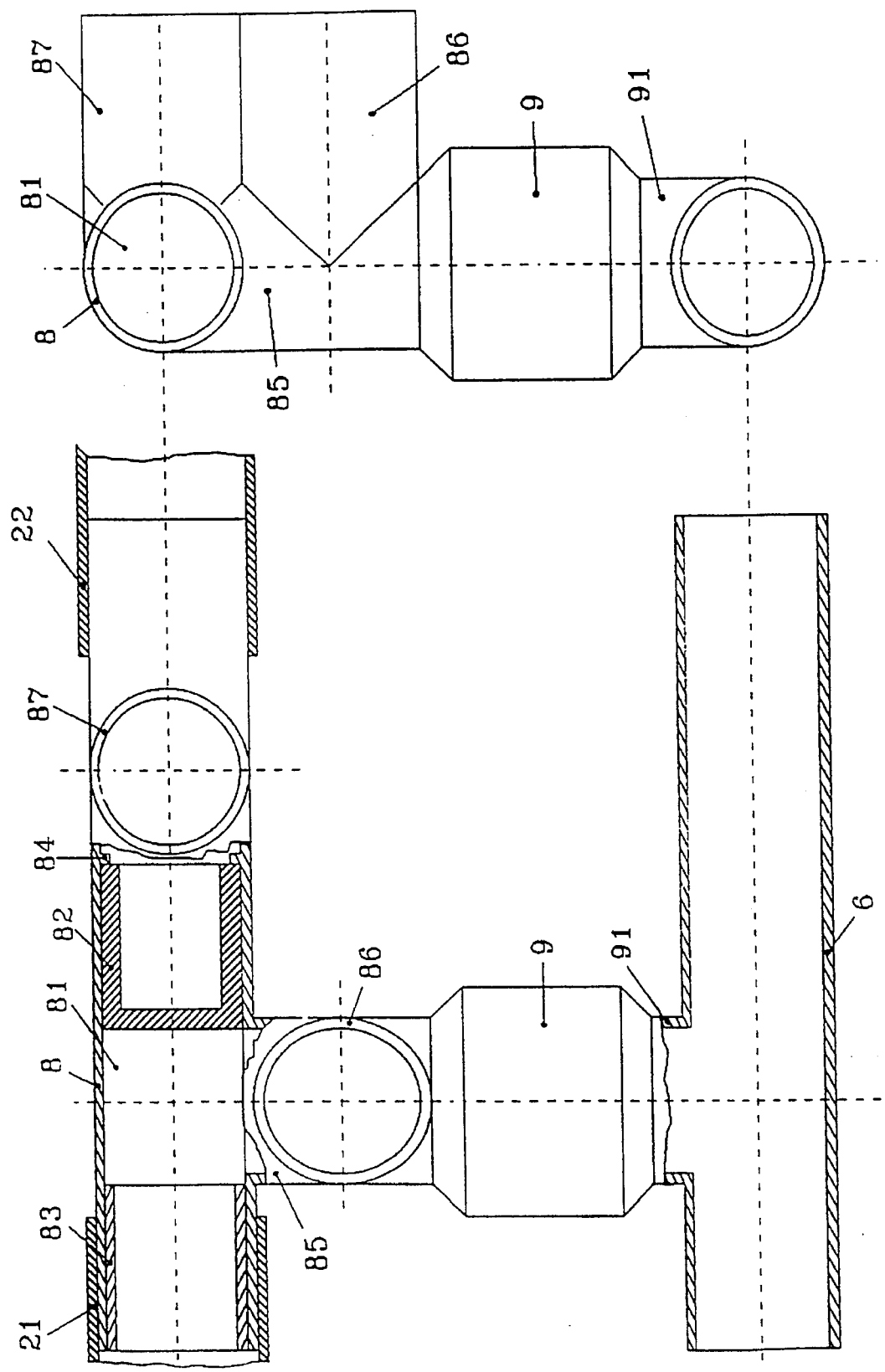

DUAL-CIRCUIT VEHICLE HEATER

FIELD OF THE INVENTION

The present invention pertains to a vehicle heating system with a heater, which is able to generate heat by burning fuel and to release it to a liquid heat carrier; with a vehicle drive engine; with a heat exchanger for the interior space of the vehicle; with a heat carrier circuit with a flow pipe, which leads from the vehicle drive engine to the heater and from there to the heat exchanger; and with a return, which leads from the heat exchanger to the vehicle drive engine; as well as with a flow connection, which leads from the return to the inlet of the flow pipe, which inlet is located between the vehicle drive engine and the heater, so that a circuit is formed, which leads through the heater and the heat exchanger bypassing the vehicle drive engine.

BACKGROUND OF THE INVENTION

In the prior-art vehicle heating systems of this type, a heat carrier is heated in the heater, and from the heater it reaches a heating heat exchanger, via which the interior space of the vehicle is heated, and it returns from there, usually still with a considerable caloric content, to the vehicle drive engine and from there again to the heater. This prior-art circuit offers the advantage of good preheating of the vehicle drive engine before a cold start in the winter. However, it has the disadvantage that the heat carrier reaches the heater in a greatly cooled state because of the considerable heat losses in the rather long lines and due to the release of heat to the vehicle drive engine, and it must be reheated there. To obtain relatively short times for deicing the windshield in spite of this, it is necessary to use a heater design for an excessively high capacity, or to accept a longer heating. This in turn means power consumption from the automobile battery for a longer time and a higher fuel consumption.

A vehicle heating system, in which the heating of the interior space of the vehicle and the deicing of the windshield are given priority, has been known from DE 39 20 505 A1. This is achieved by the heat carrier circuit having a connection line, which leads from the return to the first part of the flow pipe, which first part is located between the vehicle drive engine and the heater, so that a short circuit is formed, which passes through the heater and the heat exchanger, bypassing the vehicle drive engine, and by providing a current-actuated valve for the first part of the flow pipe or for the second part of the return, which is located between the branch of the connection line and the vehicle drive engine, wherein the current-actuated valve is controlled by the control device of the heater.

It is achieved in this prior-art vehicle heating system that the entire caloric content of the heat carrier arriving from the heater is available for the heating heat exchanger, aside from fairly minor heat losses to the environment, when the current-actuated vane is closed. The current-actuated vane opens completely or partially, thereby releasing the flow path of the heat carrier through the internal combustion engine, only when the heating heat exchanger is no longer able to supply completely enough the total amount of available heat to the interior space of the vehicle, i.e., when the heat carrier temperature increases as a consequence excessively on the outlet side.

However, this vehicle heating system is very expensive and can be retrofitted only at a great expense, and it also has the major disadvantage that power from the automobile battery is necessary for controlling the circuit, precisely at low temperatures, at which the automobile battery has a low capacity. An additional battery has therefore also been used to nevertheless supply a sufficient amount of electricity for the starting process of the vehicle.

SUMMARY AND OBJECTS OF THE INVENTION

The primary object of the present invention is to design a vehicle heating system with two circuits of this type such that each circuit can be operated alone, or one circuit can be connected to the other, in a particularly simple manner, wherein it is ensured that the heater is continuously supplied with the heat-carrying medium, and in which the connection process via one circuit to the other circuit takes place automatically in a temperature-dependent manner, and without the use of outside energy, and which is particularly suitable for subsequent installation.

DE 42 29 608 C1, which was published after the priority date, discloses a heat carrier circuit for vehicles, in which a two-way valve with integrated check valve and with a preloaded valve element brings about the switchover between a heater circuit and a circuit including the vehicle engine. An abrupt switchover is achieved with this arrangement, as a result of which the temperature decreases in the passenger compartment heating. The connection of one circuit to the other is thus impossible.

The object is attained with a vehicle heating system, in which an automatically switching two-way valve with a freely movable switching element is arranged in the flow pipe in combination with a check valve, which has a connection piece to the return. The circuits are switched here by a valve, which has a smooth passage with a switching element freely movable between two steps, with a first connection piece behind the stop which is the first stop in the direction of flow and at which another, second connection piece is arranged, and with a third connection piece, which branches off from the smooth passage behind the stop which is the second stop in the direction of flow, and the check valve, which is connected to the return, is arranged in the first connection piece behind the branch of the second connection piece. This valve, of a particularly simple design, which is arranged in the flow pipe of the vehicle heating system, consequently has connections to the heater and from the heater, and, via an integrated check valve, it has a connection to the return of the vehicle heating system. This offers the advantage that only a single component must be mounted in the existing circuit in the case of a retrofitting. It is installed in the flow pipe, and a connection with the return is produced by the return valve, and the heater is connected to the two remaining connection pieces. A system solution is thus created for the first equipment set and for the subsequent installation, and the valve, being a simple component, can be manufactured at a low cost, and any and all connections for outside energy are eliminated.

In a preferred embodiment, the second and third connection pieces of the valve, between which the heater is arranged, are arranged in parallel and extending in the same direction, so that the outlet to the heater and the inlet from the heater are located on one side, as a result of which a particularly simple connection of the heater with small space requirement is obtained. The valve belonging to the vehicle heating system is characterized by an especially simple design. The switching element arranged in the smooth passage of the valve between two stops is preferably designed as a pipe section closed on one side. Such a switching element can be manufactured in a particularly simple manner, e.g., as a diecast part. No particular requirements are imposed in terms of the tolerance of this part, because it is arranged freely movably in the smooth passage of the valve.

It is also possible in this vehicle heating system to feed, in a very simple manner, a small amount of heat carrier in a flow pressure-dependent manner from the circuit formed by the vehicle drive engine, the heater, the heat exchanger and the vehicle drive engine into the circuit formed by the heater, the heat exchanger and the heater. To do so, the switching element is designed as a pipe section with an integrated, additional check valve. If, e.g., a spring-loaded check valve is arranged in the bottom of the switching valve, it is achieved in a simple manner that, beginning from a certain pressure, which is temperature-dependent, a very small, but variable portion of the heat transfer medium is fed into the (small) circuit heated at a higher temperature, so that a temperature peak that may have developed can be reduced, or a mixed temperature becomes established.

Forming the stops by sleeves inserted into the passage has proved to be particularly advantageous for the simple installation of the switching element in the smooth passage of the valve. These sleeves are simple components, which can easily be introduced into, adjusted and fastened in the passage.

Further details are described in the following section in which the figures are described.

It should also be pointed out that the term "vehicles" comprises both road vehicles, such as passenger cars, buses, trucks, as well as construction equipment, such as cranes and excavators, and finally also ships and the like.

Two exemplary embodiments are shown in a simplified manner in FIGS. 1 through 3, on the basis of which the vehicle heating system and its variants will be explained.

BRIEF DESCRIPTION OF THE DRAWINGS

In the drawings:

FIG. 2 is a partial sectional view of the valve according to FIG. 1, but with another connection plane; and FIG. 3 is a side view of the valve according to FIG. 2.

DESCRIPTION OF THE PREFERRED EMBODIMENT

Figure 1:
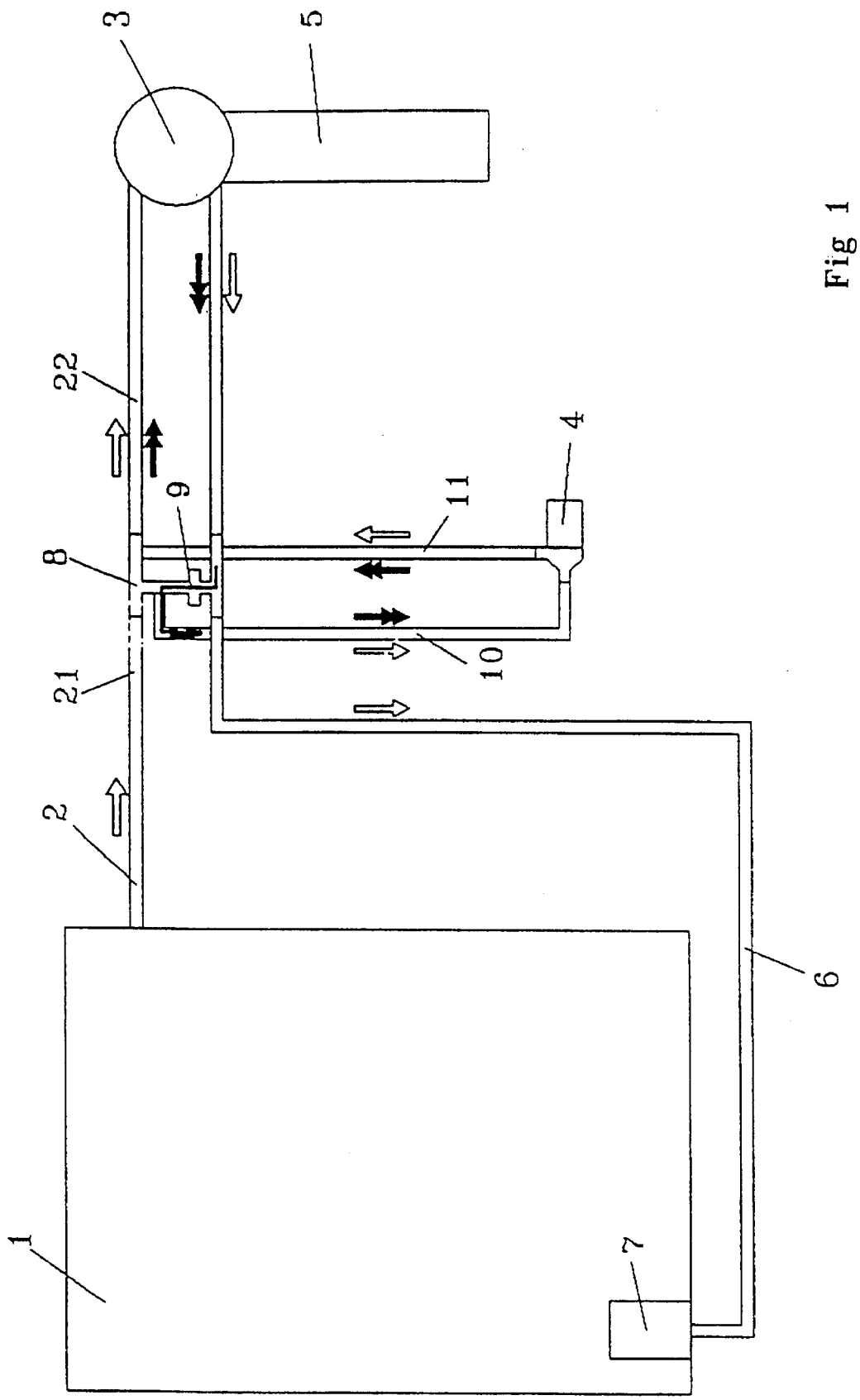
FIG. 1 is a view showing the arrangement of the vehicle heating system in a circuit.

The heating circuit shown in FIG. 1 comprises two partial circuits, which can be operated separately or jointly. One circuit comprises the vehicle drive engine 1, which also generates heat during operation. This circuit comprises besides the drive energy, a flow pipe 2, a heater 3, in which heat can be generated by burning fuel and can be released to a heat carrier, and the heat carrier pump 4 belonging to it, represented separately from the heater 3 in the exemplary embodiment, and a heat exchanger 5 via a return 6 to the water pump 7 of the vehicle drive engine 1. In this circuit, which will hereinafter be called the "large circuit" and will be indicated by simple arrows, the heat generated during the operation of the vehicle drive engine 1 is fed to the heat exchanger 5, and it is fed from there, e.g., to the passenger compartment of a vehicle in the known manner. The heat carrier flows through the heater 3 and the heat carrier pump 4 belonging to it. This heater 3 may also be connected to the large circuit as an additional heat source. Heat is now generated in the heater 3, which is operated, together with its heat carrier pump 4, independently from the vehicle drive engine 1, so that more heat can be removed in the heat exchanger 5 than is available from the vehicle drive engine 1. The heater 3 acts as an additional heating device in this case.

In the second circuit, which will hereinafter be called the "small circuit" and be indicated by double-headed arrows, the heat carrier, preferably water, which belongs to the heater 3, is sent from the heater 3 by means of the heat carrier pump 4 belonging to it via the heat exchanger 5, and the heat is used there to heat, e.g., the passenger compartment of the vehicle.

An arrangement with a so-called direct heater is shown in the circuit described according to FIG. 1. It is defined as the integrated arrangement of the heater 3 with the vehicle's heat exchanger 5 (as is shown in, e.g., DE 39 07 222 A1). The heat transfer medium, which is heated up in the heater 3 and must be the same as the medium used as the cooling medium in the vehicle drive engine 1, enters the heat exchanger 5 directly from the heater 3 in this case. This type of heating is particularly effective, because no pipelines (aside from short connection pieces) are needed between the site of generation of the heat and the heat exchanger 5. This direct heater is therefore comparable, in terms of action, to an immersion heater associated with the heat exchanger 5. Since only a very limited installation space is usually available for such a direct heater, the heat carrier pump 4 belonging to the heater 3 was arranged separately from the heater 3 in the heating circuit shown in FIG. 1, even though it is part of the heater 3. Thus, only a relatively small amount of a heat carrier is heated with this small circuit, so that heat can be released to the passenger compartment of the vehicle via the heat exchanger 5 and the passenger compartment can be heated very rapidly after the heater 3 has been put into operation. Regardless of its arrangement in the circuit and its embodiment, the heater with the heat carrier pump 4 has comprehensive control and regulating devices, which are integrated in some heaters in a control device and control and regulate both the processes, such as the fuel and combustion air supplies as to the their time and amount, the ignition and the possible blow-off of unburned fuel components from the combustion chamber after the heater has been shut off, and the heating capacity. It is possible to run predetermined programs, e.g., in cooperation with a timer. The control device may also have an error analysis means, so that errors that occur can be diagnosed.

The circuits are switched in the exemplary embodiment via a single, automatically operating two-way valve 8, which is structurally integrated with a check valve 9, wherein the distance between the two-way valve 8 and the check valve 9 may be varied, depending on the line routing of the flow pipe 2 and the return 6. The term "automatically operating" means that the actuation takes place without the use of outside energy, e.g., electricity (in the case of solenoid valves) or of a pressurized medium (in the case of pneumatic valves), and exclusively by the medium present, namely, the pressure of the heat carrier in the flow pipe 2 for the two-way valve 8 and the pressure of the heat carrier in the return 6 for the check valve 9 in the exemplary embodiment.

The two-way valve 8 with the check valve 9, which is represented in FIG. 2 and will be described below, and which will hereinafter be called the combination valve 8/9, has two connecting branches in a different plane compared with the representation in FIG. 1. The combination valve 8/9 is arranged in the flow pipe 2 of the heating circuit, with the inlet 21 from the vehicle drive engine 1 and with the outlet 22 to the heater 3. A switching element 82, which can move between two stops 83 and 84, is arranged in the smooth passage 81 of the combination valve 8/9. These stops 83/84 may be formed by sleeves inserted into the smooth passage 81. The switching element 82 in this exemplary embodiment is a pipe section closed on one side, whose length is about 1.5 to 2.5 times a connection piece 85 connected to the passage 81. This connection piece 85 leads to the check valve 9, which is connected to the return 6 with a connection piece or fitting 91. Another connection piece 86, which is connected to a line 10 leading to the heat carrier pump 4 of the heater 3, branches off from the connection piece 85 between the passage 81 and the check vane 9, and in the arrangement according to FIG. 1, with the heat carrier pump 4 arranged separately from the heater 3. This heat carrier pump 4 returns the heat carrier, which flows in via the line 10, to the flow pipe 2 via a line 11. To achieve this, another connection piece, to which the line 11 is connected, branches off at the passage 81. The length of the connection pieces 85 and 91 depends on the distance between the flow pipe 2 and the return 6. Since this distance may obviously differ greatly, depending on the specific installation situations of the heating system in vehicles, the lengths of the connection pieces 85 and 91 are different as well.

As is described in the exemplary embodiment, the switching element is a pipe section closed on one side. However, it may also be a component with concavely deformed jacket and be closed on one side, in which case the two front surfaces form the sealing surfaces, and the contact surface on the smooth passage 81 is reduced. The closed side of the switching element 82 is always the end pointing toward the vehicle drive engine 1.

During operation in the small circuit—double-headed arrows—the heat carrier pump 4 begins to operate when the heater 3 is switched on, and it delivers water as the heat carrier via the line 11 to the combination vane 8/9, to the heater 3, and, via the line 10, back to the heat carrier pump. A higher pressure develops now at the combination vane 8/9 on the side of the line 22 than in the line 21 in the flow pipe 2 from the vehicle drive engine 1. Due to this higher pressure in the line 22 of the flow pipe 2, the switching element 82 in the combination valve 8/9 is moved in the direction of the line 21 to the stop 83, and it closes the line 21 and the connection piece 85, so that only the small circuit is in operation. An amount of water, which is small compared with the large circuit, is now heated very rapidly, and heat can be released in the heat exchanger 5 to the vehicle passenger compartment in a short time after the heater 3 has been switched on, so that rapid deicing of the windshield is also possible. After sufficient heating of the passenger compartment, the heater 3 may be switched in the known manner to a lower heating capacity. The check valve 9 is opened in this small circuit into the return 6 by the existing pressure.

When the vehicle drive engine 1 is started and the (vehicle) water pump 7 associated with the vehicle drive engine 1 begins to deliver, a higher pressure develops in the flow 2. The pressure acting on the combination valve 8/9 via the inlet 21 moves the switching element 82 to the stop 84. The access to the connection piece 85 becomes free as a result. The check valve 9 is closed in this direction, so that the heat carrier enters the line 10 via the connection piece 86, from there the heater 3 via the heat carrier pump 4 and the line 11, and the outlet 22, the heat exchanger 5 from there, and again the water pump 7 and the vehicle drive engine 1 via the return 6. The heater 3 and the heat carrier pump 4 belonging to it are not switched on in this large circuit. Since the pressure in the return 6 is lower than the opening pressure of the check valve 9, the latter remains closed. Thus, only heat from the engine circuit, i.e., the heat generated by the vehicle drive engine, is transferred to the vehicle passenger compartment in the heat exchanger 5.

The two circuits, namely, the large circuit and the small circuit, may also be combined. The heater 3 with the heat carrier pump 4 is usually first switched on in order to rapidly heat up the vehicle passenger compartment. This "small circuit" has already been described. When the vehicle drive engine 1 and thus the large circuit are started, there is an increase in pressure in the line 21 in the flow pipe 2 due to the operation of the water pump 7, this increase in the pressure acts on the switching element 82 and moves the same in the direction of the stop 84. The path as described in the large circuit becomes free as a result, and the cooling medium being delivered by the water pump 7 associated with the vehicle drive engine 1 is mixed with the small circuit. Even though the heating medium temperature in the small circuit initially decreases as a result, and this has the disadvantage that, for a very short time, less heat is released by the heat exchanger 5 to the passenger compartment, which had already been preheated by then, this is contrasted by the considerable advantage that the vehicle drive engine 1 is supplied from the very beginning, via the return 6, with heat carrier (water) heated via the small circuit, and it is thus preheated. Measurements have demonstrated that an approximately equal pressure becomes established before and behind the switching element 82 during the operation of the two circuits (vehicle drive engine 1 on, heater 3 on), so that the switching element 82 assumes a position between the stops 83 and 84, and both circuits are in operation. It is, of course, also possible to additionally connect the heater 3 with the vehicle drive engine 1 running, i.e., to connect the small circuit to the large circuit, which corresponds to an additional heating. However, this becomes necessary only when the vehicle drive engine 1 is operated at low outside temperature under driving conditions under which the vehicle drive engine 1 releases a relatively small amount of heat for heating purposes.

While a specific embodiment of the invention has been shown and described in detail to illustrate the application of the principles of the invention, it will be understood that the invention may be embodied otherwise without departing from such principles.

I claim:

1. A vehicle heating system, comprising:

a heater including means for generating heat by burning fuel for releasing heat to a fluid heat carrier;

a vehicle drive engine;

a heat exchanger for heat exchange with the interior space of the vehicle;

a heat carrier circuit with a flow pipe with an inlet, said flow pipe leading from the vehicle drive engine to said heater and leading from said heater to said heat exchanger, said flow pipe having an inlet and a return, which leads from said heat exchanger to said vehicle drive engine, as well as with a flow connection, which leads from said return to said inlet of said flow pipe, said inlet being located between said vehicle drive engine and said heater, a secondary circuit being formed, which passes through said heater and said heat exchanger bypassing said vehicle drive engine;

automatically switching two-way valve means with a freely movable switching element in combination with a check valve, said automatically switching two-way valve means being arranged in said flow pipe; and a connection piece, said check valve being connected to said return by said connection piece.

2. A vehicle heating system in accordance with claim 1, wherein said automatically switching two-way valve means includes a smooth passage with two stops, said freely movable switching element being disposed in said smooth passage, freely movable between said two stops, a vane first connection piece behind a first of said stops, which is the first stop in the direction of flow, a valve second connection piece which branches off from said smooth passage, and a valve third connection piece behind a second of said stops, which is the second stop in the direction of flow, said check valve, which is connected to said return, is arranged in said valve first connection piece behind a branch of said valve second connection piece.

3. A vehicle heating system, comprising:

a heater including means for releasing heat to a fluid heat carrier;

a vehicle drive engine;

a heat exchanger for heat exchange with an interior space of a vehicle;

a heat carrier circuit with a supply flow pipe, said supply flow pipe leading from the vehicle drive engine to said heater and leading from said heater to said heat exchanger, said heat carrier circuit including a return flow pipe said return flow pipe leading from said heat exchanger to said vehicle drive engine, said heat carrier circuit including a flow connection piece leading from said return flow pipe to said supply flow pipe at a position between said vehicle drive engine and said heater, said flow connection piece forming a secondary circuit passing through said heater and said heat exchanger, and bypassing said vehicle drive engine;

a valve positioned in said supply flow pipe, said valve including switching means for switching flow of said heat carrier from said engine based on a pressure of said heat carrier; and a check valve positioned in said flow connection piece.

4. A vehicle heating system in accordance with claim 3, wherein:

said vane and said check vane are formed as a single unit connected to said supply flow pipe and said return flow pipe.

5. A vehicle heating system in accordance with claim 3, further comprising a heater pump cooperating with operation of said heater and being connected to said supply and return flow pipes;

said switching means having a first side exposed to pressure from said engine between said engine and said heater, said switching means having a second side exposed to pressure from said heater pump.

6. A vehicle heating system in accordance with claim 3, wherein:

said valve includes a smooth passage with an upstream and a downstream stop, said switching means being disposed in said smooth passage and being freely movable between said two stops, said valve including a valve first connection piece positioned downstream of said upstream stop, said valve includes a valve second connection piece which branches off from said valve first connection piece, said valve includes a valve third connection piece downstream of said downstream stop;

said check valve is arranged in said valve first connection piece downstream of a branch of said valve second connection piece.

7. A vehicle heating system in accordance with claim 5, wherein:

said heater pump is arranged between said valve second connection piece and said valve third connection piece, said valve second connection piece and said valve third connection piece extend in parallel and in the same direction.

8. A vehicle heating system in accordance with claim 6, wherein said heater is arranged between said vane second connection piece and said valve third connection piece, said valve second connection piece and said valve third connection piece extend in parallel and in the same direction.

9. A vehicle heating system in accordance with claim 6, wherein said switching means comprises a pipe section which is closed on one side.

10. A vehicle heating system in accordance with claim 8, wherein said switching means comprises a pipe section which is closed on one side.

11. A vehicle heating system in accordance with claim 6, wherein said switching means comprises a pipe section with an additional integrated check valve.

12. A vehicle heating system in accordance with claim 8, wherein said switching means comprises a pipe section with an additional integrated check valve.

13. A vehicle heating system in accordance with claim 6, wherein said stops are formed by sleeves inserted into said smooth passage.

14. A vehicle heating system in accordance with claim 6, wherein said switching means has a length which is 1 to 2.5 times a diameter of said valve first connection piece.

15. A vehicle heating system in accordance with claim 6, wherein said smooth passage and the said valve connection pieces have the same diameter.

* * * * *